United States Patent [19]

Bowling et al.

[11] Patent Number: 4,809,015

[45] Date of Patent: Feb. 28, 1989

[54] CONTINUOUS INK JET PRINTER HAVING MODULAR PRINT HEAD ASSEMBLY

[75] Inventors: Bruce A. Bowling, Beavercreek; Douglas J. Buma, Springboro; Bruce W. Gamble, Fairborn, all of Ohio; Robert D. Donaldson, Mount Airy, N.C.

[73] Assignee: Eastman Kodak Company, Rochester, N.Y.

[21] Appl. No.: 168,094

[22] Filed: Mar. 14, 1988

[51] Int. Cl.$^4$ .............................................. G01D 15/18

[52] U.S. Cl. .................................. 346/75; 346/140 R

[58] Field of Search .............................. 346/75, 140 R

[56] References Cited

U.S. PATENT DOCUMENTS

| | | | |
|---|---|---|---|
| 4,369,450 | 1/1983 | Iwagami et al. | 346/75 |
| 4,520,367 | 5/1985 | Ishikawa et al. | 346/75 |
| 4,520,369 | 5/1985 | Shackleton | 346/75 |
| 4,617,574 | 10/1986 | Millet et al. | 346/75 |

*Primary Examiner*—E. A. Goldberg
*Assistant Examiner*—Gerald E. Preston
*Attorney, Agent, or Firm*—John D. Husser

[57] ABSTRACT

A modular print head system for continuous ink jet printer apparatus includes a droplet stream generator, a droplet charger and a droplet catcher constructed as a module that includes ink supply and return line coupling devices, each having engagement openable valves, resonator and charge plate connectors, and index surfaces for accurately positioning of the module. A nest assembly of the system includes ink supply and return ports, droplet generator and charging power terminals, structure for supporting and accurately positioning a print head module. The nest assembly further includes a camming device which is movable to engage a supported module into an operative relation with the ink lines coupled to the ports, the valves open, the droplet generator and charger connected and to nest power terminals and the module index surfaces in contact with the positioning structure of the nest assembly.

3 Claims, 6 Drawing Sheets

FIG. 9
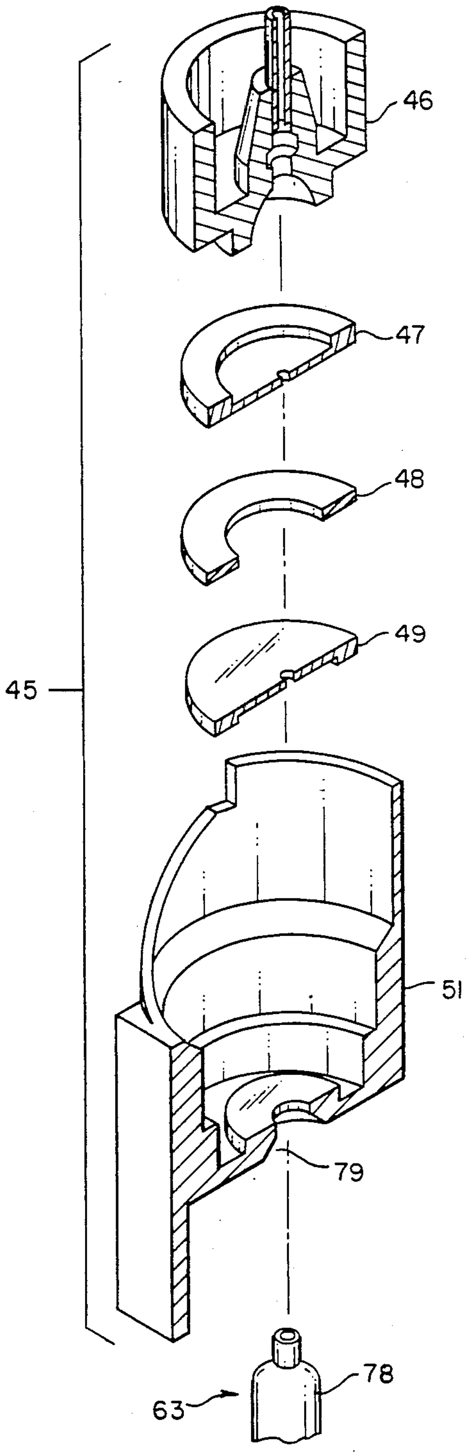
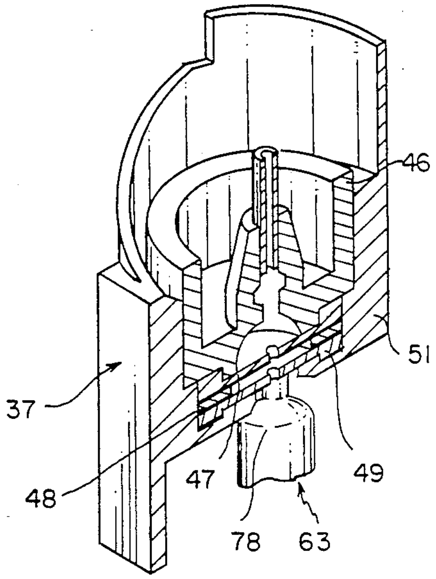
FIG. 10

CONTINUOUS INK JET PRINTER HAVING MODULAR PRINT HEAD ASSEMBLY

FIELD OF THE INVENTION

The present invention relates to improvements in continuous ink jet printer systems and more particularly to modular constructions whereby the droplet stream generator subsystem, the droplet charging subsystem, the droplet catching subsystem and droplet path air guide subsystem of such printer systems are easily and cleanly removable as a unit.

BACKGROUND OF THE INVENTION

In continuous ink jet printer systems ink is supplied under pressure to the orifice cavity of a resonator body and ejects as continuous streams from an orifice plate aimed toward a print zone. The resonator body is vibrated to cause the ink streams to break up into uniformly sized and shaped droplets. A charge plate subsystem is located proximate the stream break-up point and droplets are selectively charged if intended to be non-printing ones. The charged, non-printing drops are deflected to a catcher subassembly which routes them back to the main ink supply. Uncharged drops pass on to the print zone.

U.S. Pat. No. 4,623,897 discloses an embodiment of continuous ink jet printer wherein the above-noted components are constructed as a traversing print head assembly, e.g. for printing successive lines of information with 64 orifices and related charge plate elements. This print head assembly also incorporates an air guide member located adjacent the catcher for cooperating to prevent dust from reaching the charge plate/orifice plate region.

Replacement of the print head assembly is required periodically and that, heretofore, necessitated a relatively complex, messy and time consuming job, which was not at all suitable for a customer/user. For example, the resonator and charge plate electrical connections required unplug/re-plug operations, the mechanical attachments required removal and reattachment and three ink conduits required disconnection and reconnection. The realignment of the print head was a critical and tedious task, but even more distasteful was the inevitable ink leakage that occurred during the uncoupling of the fluid supply and return lines to the orifice cavity.

U.S. Pats. Nos. 4,500,895 and 3,787,880 are exemplary of other kinds of ink jet printer devices which have aimed toward simplifying the print head replacement situation; however, neither of these approaches is suitable for a continuous ink jet printing system of the kind described above.

SUMMARY OF THE INVENTION

One important objective of the present invention is to obviate the above-noted problems that are connected with the replacement of a continuous ink jet print head assembly. One advantage of the present invention is the simplicity by which a customer/user can effect replacement of such assembly, accurately and in a very brief time. Another important advantage is that replacement can be effected without any ink leaking from the printer or removed print head assembly.

In one aspect of the present invention the foregoing objects and advantages are attained, in continuous ink jet printing apparatus, by a modular print head assembly connection system that comprises (i) a print head assembly nest attached to the printer apparatus and including ink supply line and return line ports, a catcher return line port, resonator and charge plate power supply terminals and means for supporting and accurately positioning a print head assembly module, (ii) a print head assembly module including ink supply and return line coupling means each having a check valve means constructed for engage-opening cooperation with a respective port of the nest, catcher return line coupling means, charge plate and resonator connector means constructed to interfit with the respective terminals of the nest and index means for cooperating with the support and positioning means of the nest, and (iii) camming means mounted on the assembly nest and movable to force a module inserted into the nest into operative relation with the ink lines coupled, the check valves open and the resonator and charge plate connector means electrically coupled to their respective power supply terminals.

BRIEF DESCRIPTION OF THE DRAWINGS

The subsequent description of preferred embodiments refers to the attached drawings wherein:

FIGS. 9 and 10 are respectively enlarged exploded and assembled perspective views showing details of the check valve/printer port construction of the FIGS. 3–8 system.

DETAILED DESCRIPTION OF THE PREFERRED EMBODIMENTS

Figure 1:
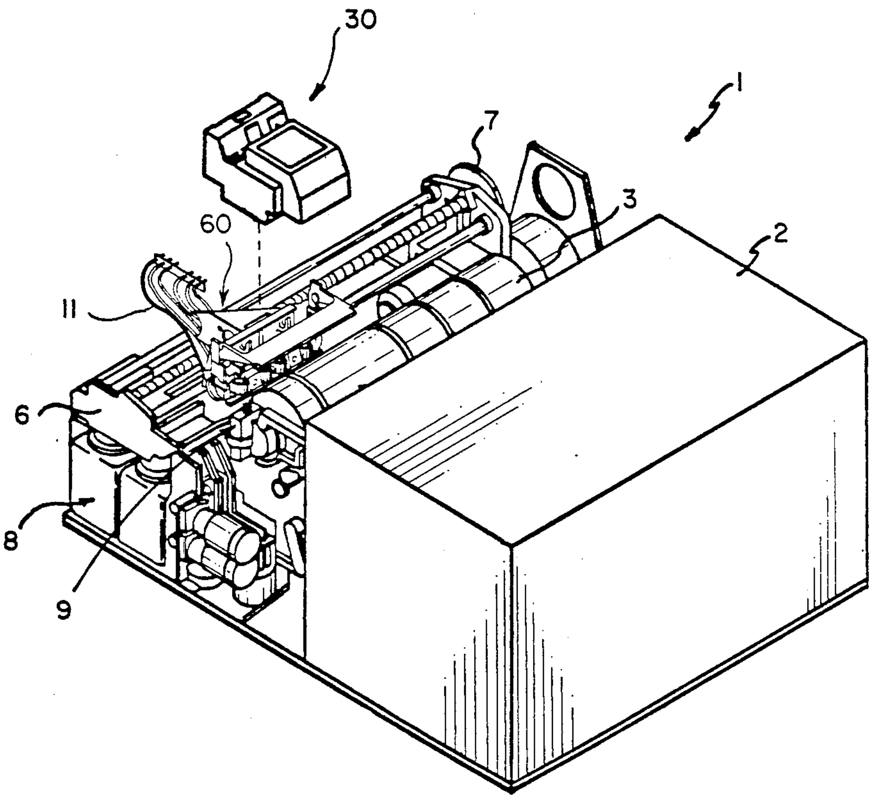
FIG. 1 is a perspective view of a continuous, traversing head, ink jet printer incorporating one embodiment of the present invention.

FIG. 1 illustrates schematically an exemplary ink jet printing apparatus 1 employing one embodiment of the present invention. In general, the apparatus 1 comprises a paper feed and return section 2 from which sheets are transported into and out of operative relation on rotatable cylinder 3. The detail structure of the sheet handling components does not constitute an essential part of the present invention and need not be described further.

Also illustrated generally in FIG. 1 is a print head nest 60 which is mounted for movement on carriage assembly 6 by appropriate drive means 7. During printing operation the print head assembly 30 is mounted in nest 60 to traverse across a print path in closely spaced relation to a print sheet which is rotating on transport cylinder 3. Ink is supplied to and returned from the print head assembly by means of flexible conduits 11 which are coupled to an ink cartridge(s) 8. A storage and start-up station 9 is constructed adjacent the left side (as viewed in FIG. 1) of the operative printing path of print head assembly 5; and the drive means 7 are constructed to transport particular portions of a supported print head assembly 30 into operative relations with station 9 at appropriate sequences of the operative cycle of apparatus 1.

Figure 2:
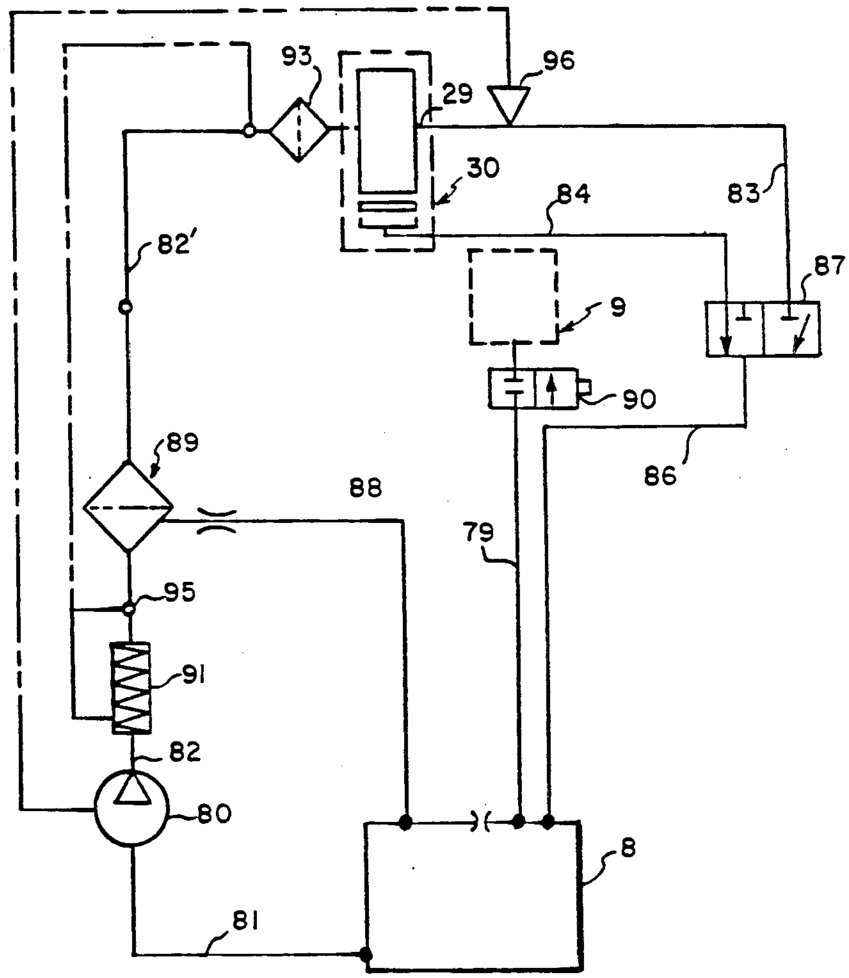
FIG. 2 is a fluid flow diagram of one ink recirculation system of the FIG. 1 printer.

An ink circulation system for the FIG. 1 printer can include various ink conduits (i.e. lines) which form a closed-loop ink recirculation path, one for each different ink color and cooperative print head. FIG. 2 schematically illustrates one such closed-loop system wherein pump inlet line 81 extends from ink supply cartridge 8 to the inlet of pump 80, outlet line 82 extends between pump 80 and a main filter 89, head supply 82' extends from main filter 89 to the print head inlet and head return line 83 extends from the print head outlet to a junction, including three-way solenoid valve 87, between catcher return line 84 and the main ink return line 86. An ink return line 79 also extends from start-up and storage station 9 to cartridge 8, via solenoid valve 90. An air bleed line 88 extends from main filter 89 back to cartridge 8. The FIG. 2 circulation system can include heater 91, final filter 93, temperature sensor(s) 95 and pressure sensor 96.

Figure 3:
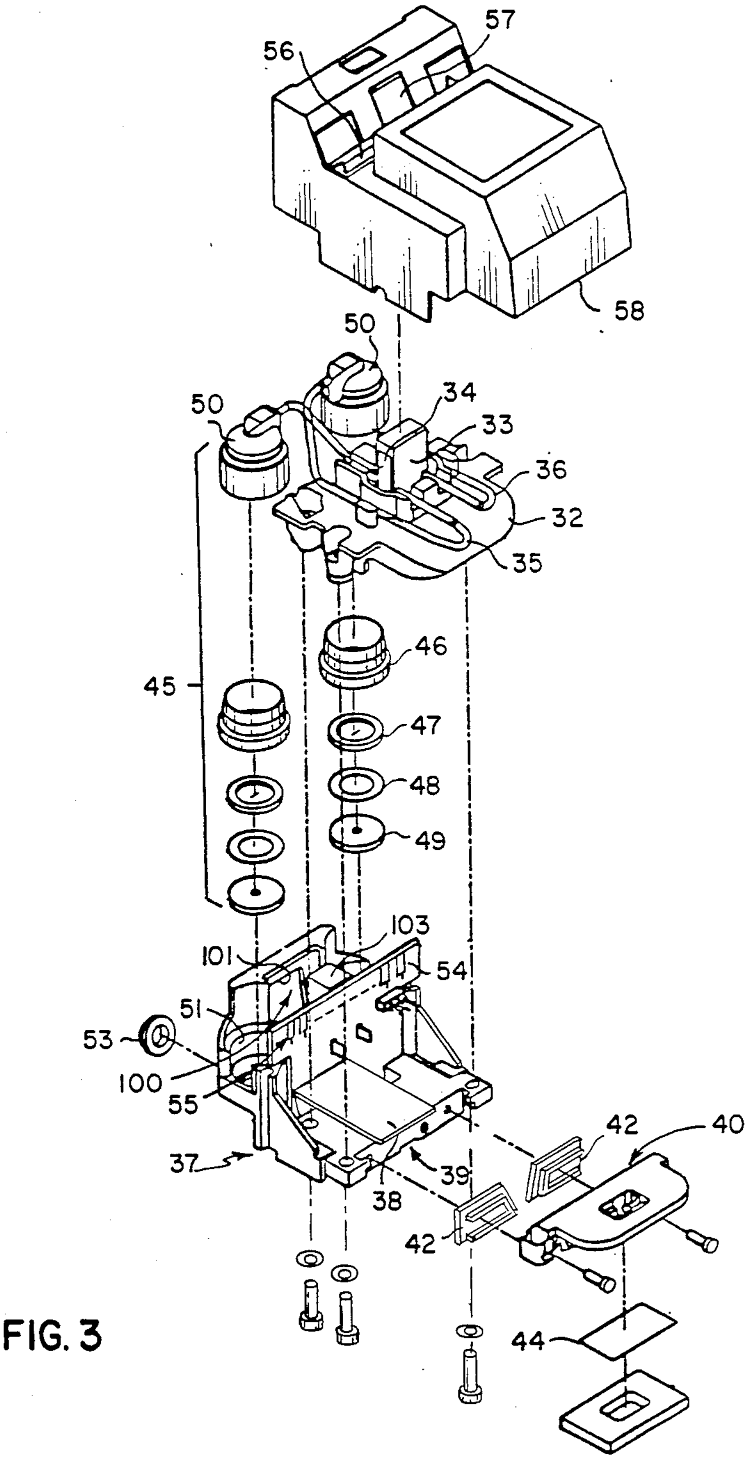
FIG. 3 is an exploded perspective view of one preferred print head assembly module in accord with the present invention.

In accord with the present invention, the printer 1 has a modular system wherein a print head assembly module 30 can be easily inserted into operative relation in a module nest 60 which traverses the print zone of the printer. The detail construction of the print head assembly module 30 is shown in FIG. 3 with parts in an exploded-view relation. Thus the upper print head portion is mounted on a module upper frame 32, and includes a resonator body 33 having piezoelectric transducer strips 34 mounted thereon. Ink inlet and outlet tubes 35, 36 extend to and from openings in the sides of the body 33 and the openings lead to an ink cavity that communicates with the orifice plate (not visible). The orifice plate is coupled to the body 33 and exposed through an opening in the central portion of upper frame 32 to direct ink droplet streams downwardly. The detail construction of the resonator body and transducer can be as described in U.S. Pat. No. 4,646,104 and the orifice plate can be constructed as described in U.S. Pat. No. 4,184,925.

The components of the lower print head portion are mounted on a lower frame 37 and include a charge plate assembly 38 and a droplet catcher 39. The detail construction of the charge plate can be as described in U.S. Pat. No. 4,560,991 and droplet catcher details can be as described, e.g. in U.S. Pat. No. 3,813,675; 4,035,811 or 4,268,836. Preferred techniques for interconnection of the charge plate on the catcher are described in U.S. Pat. No. 4,622,562. As shown in FIG. 3 an air guide assembly 40 is constructed to interfit on lower frame 37 in opposing relation to the operative charge plate and catcher surfaces. Preferred constructions and function of the air guide are described in U.S. Pat. No. 4,591,869 which also explains how air induced through a filter, such as 44 in FIG. 3, provides a positive flow of air, downwardly through the space between the catcher and air guide, to protect the orifice plate, charge plate and upper catcher regions from paper dust. The air guide parts interfit onto the lower frame with sandwiching side air guides 42 therebetween, as shown in FIG. 3.

FIG. 3 also illustrates how the upper frame 32 is secured onto lower frame 37, and that the ink supply and return tubes to and from the body 33 terminate into supply and return line coupling assemblies 45. Each such assembly includes an upper retainer 46, a check valve 47, a spacer 48 and a seal 49. These parts interfit between caps 50 and the lower retainer 51 formed in the lower frame 37 to provide pressure actuatable couplings for the module. Final filter 93 can be constructed within the inlet line cap 50. The details of this coupling structure and its aligning interfit relation with port 62, 63 of the printer nest 60 is shown in FIGS. 9 and 10.

The rear of frame 37 also has a coupling 53 which is adapted to interfit in sealing relation with the catcher return line port 64 of nest 60 and a channel in the lower portion of lower frame 37 leads from the bottom of catcher 39 to coupling 53. A printed circuit plate 54 has connector pads 55 to cooperate with terminals of nest 60 when the module is clamped into operative relation in nest 60. A cover member 58 is constructed to snap fit over the module assembly and has a top slit 56 to provide access to the connector pads 55.

Figure 4:
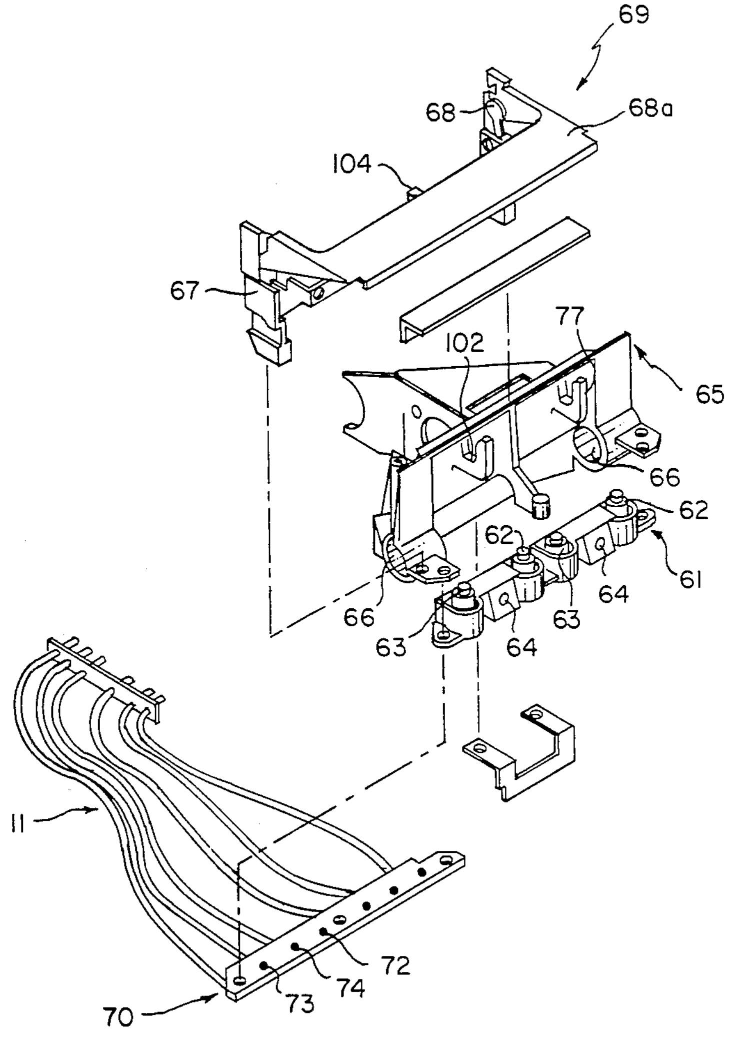
FIGS. 4 and 5 are respectively exploded and assembled perspective views of one preferred printer nest construction adapted for cooperation with the FIG. 3 module.
Figure 5:
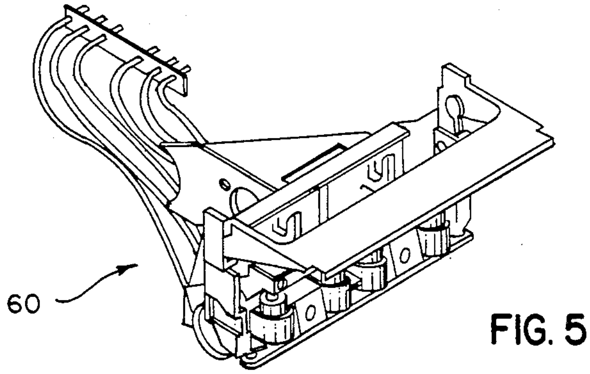
Figure 6:
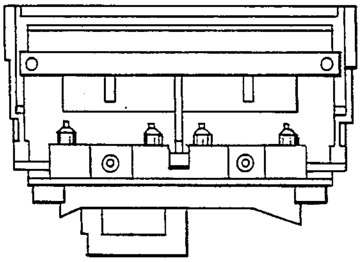
FIG. 6 is a front view of the FIG. 5 nest construction.
Figure 7:
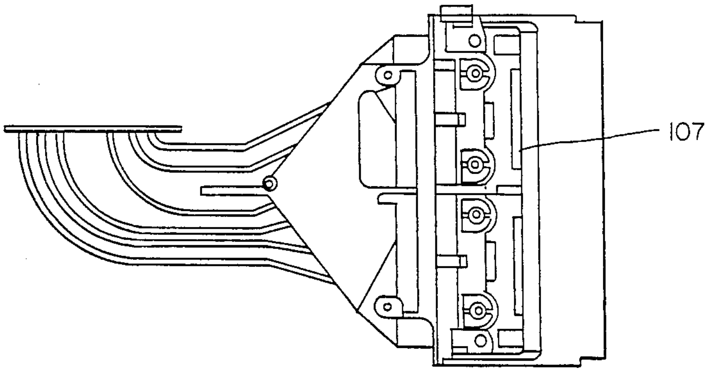
FIG. 7 is a top view of the FIG. 5 nest construction.
Figure 8:
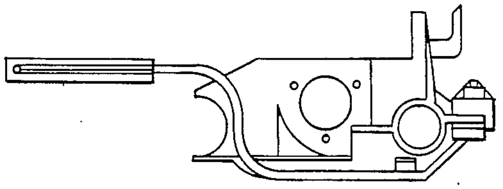
FIG. 8 is a side view of the FIG. 5 nest construction.

The mode of cooperation between module 30 and printer nest 60 will become apparent by considering the nest construction shown in FIGS. 4-8. Thus, the nest assembly 60 is constructed to receive, support and positionally index two modules 30 into operative fluid and electrical cooperation in the printer 1. The nest 60 comprises a base 61 formed to provide two sets of supply and return line ports 62, 63. A catcher return line port 64 is located between each supply/return port set. A positioning and mounting bracket 65 fits onto frame 61 as shown in FIG. 4 and includes bearing means 66 for supporting the nest for traverse in the printer. A cam-latch assembly 69 is constructed to mount upon bracket 65 as shown in FIG. 4 and includes upright post members 67 and an overcenter bar latch mechanism 68 pivotally attached to the posts to move from a rear (unlatched) position to a forward (latched) position as shown in FIG. 5. Referring back to FIG. 4, a manifold plate 70 is constructed to attach to the bottom of base 61 and includes ports 72, 73, 74 for respectively coupling port portions 62, 63 and 64 to the supply, return and catcher return lines 11 of the printer (which eventually lead to ink reservoirs 8 as shown in FIG. 2).

The module 30 and nest 60 are designed to cooperate mechanically so that the print head assembly of the module will mount accurately and repeatedly in the same position. This is accomplished by providing the exact number of constraints to index the unit in space without redundancy and the fluid contacts between nest and module are therefore incorporated into the positioning scheme. Thus, to effect insertion of a module 30 into operative relation in a printer, the cam-latch assembly 69 is swung to its rear position and a module 30 is placed into the nest with the lower retainer portions of assemblies 45 resting on supply and return line ports 62, 63. Referring to FIG. 9 it can be seen that the upper surfaces 78 of the ports 62, 63 are spherical in shape and the lower portions 79 of the retainer 51 is conically shaped to precisely position the module on the ports. This interface provides constraint in both directions of horizontal translation and in two directions of rotation. The module 30 has an opening 100 in the rear wall of its frame 37 and an upper index surface 101 of that opening is constructed to be placed on hooks 77 formed on bracket 65 of nest 60. The lower frame 37 also has an abutment surface 103 forward of opening 100 and the surfaces 101 and 103 of a module 30 cooperate with surfaces 102 and 104 to constrain the print head module in the other (pitch) rotation direction.

With the module 30 resting on surfaces 102 of hooks 77 and surfaces 78 of ports 62, 63, the latch assembly 68 is moved to its forward position. During this movement, cam surfaces on the lower portion of arm 68a force the module downwardly to a fully seated position. When arm 68a has moved to its over center latch position, surfaces 103/104 interface (through opening 57) in cooperation with interface 78/79 to constrain the print head vertically.

As the latch bar moves the module to its seated location, fluid and electrical cooperations between the module and nest are established. Thus, a portion of the latch arm 68a has card edge connectors 107 which engage the printed circuit boards 54 on the inserted module through slit 56 of cover 58. Also, the tube portion on the top of surface 78 penetrates the pressure seal 49 and check valve 47 of assembly 45.

Removal of the module involves only the rearward unlatching by arm 68a and lifting the module from the nest. The check valves 47 prevent drainage from print head cavity and supply and return tubes. The catcher port does not contain residual ink because of vacuum or gravity draining during operation.

The invention has been described in detail with particular reference to preferred embodiments thereof, but it will be understood that variations and modifications can be effected within the spirit and scope of the invention.

We claim:

1. In continuous ink jet printer apparatus, a modular print head system comprising:

(a) a nest assembly attached to said printer apparatus and including ink supply and return line ports, a catcher return port, charge plate and resonator power terminals and means for supporting and accurately positioning a print head module;

(b) a print head module including ink supply and return line coupling devices each having valve means constructed for engage-opening cooperation with a respective port of said nest, catcher coupling means, charge plate and resonator connector means constructed to interfit with respective terminals of said nest assembly, and index means for cooperating with said support and positioning means of said nest assembly; and (c) camming means mounted on said nest assembly and movable to engage a supported module into an operative condition, coupled to said ports with said check valves open and with said resonator and charge plate connector means electrically coupled to their respective power supply terminals.

2. For use with continuous ink jet printer apparatus of the type having a nest assembly including ink supply and return line ports, a catcher return port, charge plate and resonator power terminals, means for supporting and accurately positioning a modular print head and means for camming said module into an operative condition in said printer, a print head module comprising:

(a) a droplet generator including a resonator body with an ink cavity having ink inlet and outlet means, orifice means and an electromechanical transducer;

(b) a droplet charge plate located downstream from said orifice means;

(c) droplet catcher means located downstream from said charge means;

(d) ink cavity inlet and outlet coupling means each having valve means constructed for engage-opening cooperation with a respective port of such printer nest assembly;

(e) catcher return line coupling means;

(f) charge plate and transducer connector means constructed to interfit with such printer nest assembly terminals;

(g) index means for cooperating with the support and positioning means of such printer nest assembly; and (h) module surface means, constructed and located to cooperate with the camming means of such printer nest, for moving said module into said operative condition.

3. In continuous ink jet printer apparatus, a modular print head system comprising:

(a) a print head, having a droplet stream generator, droplet charging means and droplet catching means, and being constructed as a module which includes: (i) ink supply and return line coupling devices, each having engagement openable valve means, (ii) resonator and charge plate connector means, and (iii) index means for accurately positioning said module; and (b) a nest assembly including ink supply and return ports, droplet generator and charging power terminals, means for supporting and accurately positioning a print head module and camming means movable to engage a supported module into operative relation wherein: (i) said ink lines are coupled to said ports, (ii) said valve means are open, (iii) said droplet generator and charging means are connected to said nest power terminals and (iv) said index means are in accurate contact with said nest assembly positioning means.

* * * * *